United States Patent [19]

Secord

[11] Patent Number: 4,929,024

[45] Date of Patent: May 29, 1990

[54] POWER SEAT RECLINER

[75] Inventor: Tyrone R. Secord, Sterling Heights, Mich.

[73] Assignee: Fisher Dynamics Corporation, St. Clair Shores, Mich.

[21] Appl. No.: 373,248

[22] Filed: Jun. 29, 1989

[51] Int. Cl.$^5$ .............................................. B60N 1/06
[52] U.S. Cl. ....................................... 297/362; 74/640
[58] Field of Search .................. 74/640; 297/362, 361

[56] References Cited

U.S. PATENT DOCUMENTS

| 4,195,881 | 4/1980 | Kluting et al. | 297/362 |
| 4,402,547 | 9/1983 | Westen et al. | 297/362 |
| 4,521,055 | 6/1985 | Fudala | 297/362 |
| 4,685,735 | 8/1987 | McFalls et al. | 297/362 |

FOREIGN PATENT DOCUMENTS

| 2822135 | 11/1979 | Fed. Rep. of Germany | 297/362 |
| 2931894 | 2/1981 | Fed. Rep. of Germany | 297/362 |

Primary Examiner—Peter A. Aschenbrenner
Attorney, Agent, or Firm—Harness, Dickey & Pierce

[57] ABSTRACT

A power seat recliner mechanism particularly adapted for motor vehicle applications. The recliner mechanism includes an electric drive motor meshing with a series of reduction gears. Rotation of the drive motor causes the reclined position of the seat back cushion. Forward and rearward reclining movement of the seat back is provided through reversing the direction of rotation of the drive motor. For enhanced structural characteristics, the drive motor is affixed to the lower recliner structure at both its axial ends. A rotationally compliant drive shaft for the motor can be used to absorb shock loads acting through the drive system.

5 Claims, 1 Drawing Sheet

POWER SEAT RECLINER

BACKGROUND AND SUMMARY OF THE INVENTION

This invention relates to a seat recliner mechanism for a motor vehicle and particularly to one being actuated by an electric motor.

As a customer comfort and convenience feature, many motor vehicles are equipped with seat reclining mechanisms which allow the seat occupants to recline the seat back to a desired position. For some motor vehicles, and particularly those for the luxury market, the recliner mechanism is electrically powered.

This invention is particularly related to an improved power type reclining mechanism. The mechanism features an electric drive motor which is fastened to the lower recliner structure at both of its axial ends which serves to firmly support it. The recliner mechanism further incorporates a very high reduction gear transmission which permits the use of a low output motor which provides the high torque necessary to actuate a seat recliner.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figure 1:
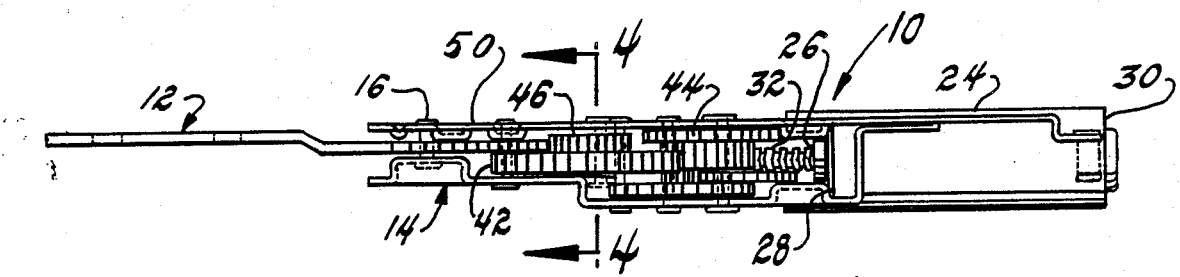
FIG. 1 is a top view of a power seat recliner mechanism according to this invention.
Figure 4:
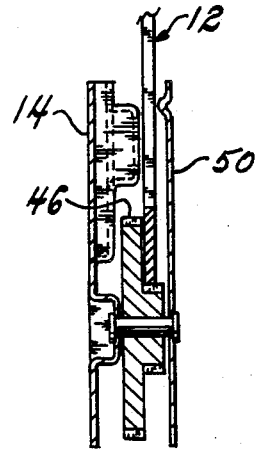
FIG. 4 is a cross-sectional view taken along line 4—4 of FIG. 1.
Figure 2:
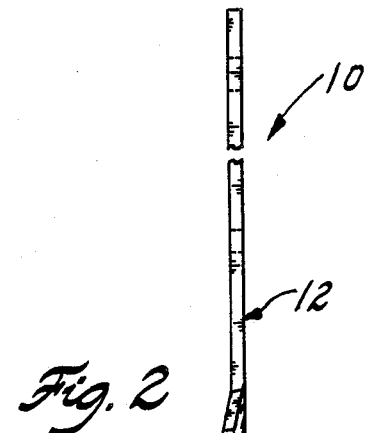
FIG. 2 is a front view of the recliner shown in FIG. 1.

A power seat recliner mechanism in accordance with this invention is shown in each of the figures and is generally designated by reference number 10. Recliner mechanism 10 generally comprises upper recliner structure 12 and lower recliner structure 50, which are attached for relative pivoting motion about pivot pin 16. Lower recliner structure 50 is adapted to be attached to a seat cushion frame which supports a seat cushion. Similarly, upper recliner structure 12 is adapted for attachment to a seat back frame which supports a seat back cushion.

Upper recliner structure 12 includes a lower toothed quadrant surface 18 which is formed along an arc with its center at pivot pin 16. Pin 20 affixed to lower recliner structure 50 travels within arcuate slot 22 formed in upper recliner structure 12. The interaction of pin 20 and slot 22 limits the maximum range of angular motion of upper recliner structure 12 relative to lower recliner structure 50. Power seat recliner mechanism 10 as shown in the figures is intended for use for front occupant seats of a four-door type vehicle in which the front seat back does not have forward folding or "dumping" capability. For applications where forward seat back dumping is necessary to provide access to a rear compartment or stowage area, additional features would be incorporated in accordance with well known design approaches.

Lower recliner structure 50 carries electric drive motor 24 and elements associated with a gear reduction transmission. Electric motor 24 is an elongated type with its drive shaft 26 extending through one of its axial ends. In a preferred embodiment, drive shaft 26 would be of a type which is torsionally compliant to absorb shock loads acting on the drive system for the device. For enhanced structural characteristics, drive motor 24 is affixed to lower recliner structure adjacent both its first end 28 and second end 30. A series of gears having differing diameters of toothed gear surfaces are used to provide the necessary gear reduction. Worm gear 32 is affixed to drive shaft 26 for rotation therewith and is supported at its axial ends by bearings 34 and 36 within bearing housing 38 which is attached to lower recliner structure 50. A series of gears including first gear 40, second gear 42, third gear 44 and fourth gear 46 are driven first by their larger diameter toothed section and drive the adjacent gear through its smaller diameter gear section to provide a gear reduction in accordance with well known gearing principles. Fourth gear 46 meshes with toothed quadrant 18. First gear 40 and worm gear bearings 34 and 36 are carried by housing 52 which is mounted to lower recliner structure 50 by rivets or other fasteners. Post 54 forms the rotational bearing for gear 40 and is attached to housing 52. Cover plate 14 encloses the gear transmission components attached to lower recliner structure 50.

Figure 3:
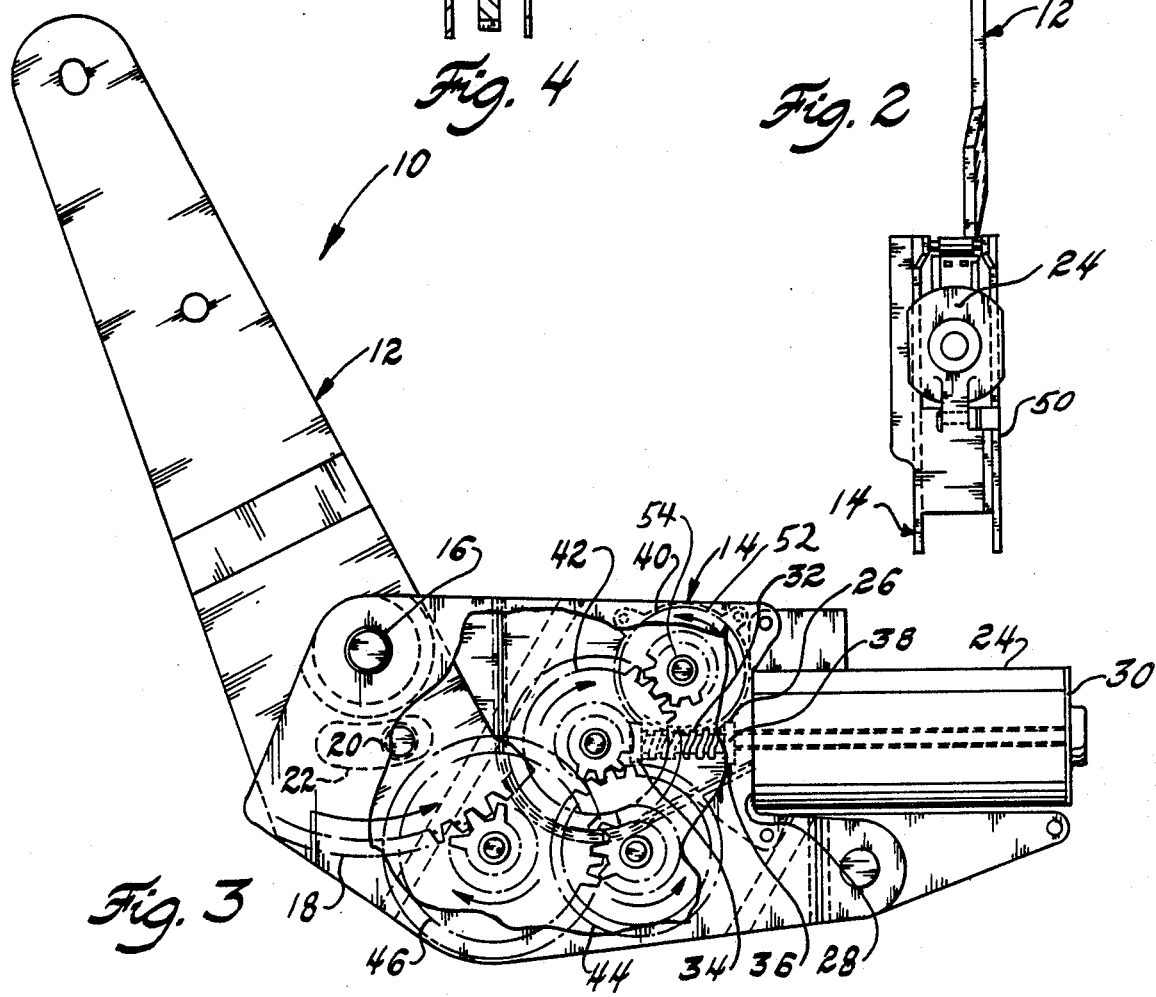
FIG. 3 is a side elevational view of the power seat recliner mechanism in accordance with this invention.

In operation, rotation of electric motor 24 causes drive gears 40 through 46 to rotate which ultimately drives upper recliner structure 12 to rotate about pivot pin 16, thereby causing changes in reclined position. The rotational direction of electric motor 24 can be reversed to cause the seat reclined position to change in an opposite direction. The arrows in FIG. 3 indicate the direction of rotation of gears 40 through 46 which cause the upper recliner structure reclined angle to be increased, i.e., rotating the seat back in a rearward direction.

While the above description constitutes the preferred embodiments of the invention, it will be appreciated that the invention is susceptible of modification, variation and change without departing from the proper scope and fair meaning of the accompanying claims.

I claim:

1. A motor vehicle power seat recliner comprising:
   an upper recliner structure for supporting a seat back cushion,
   a lower recliner structure for supporting a seat bottom cushion,
   first pivot means for enabling the reclined angle between said upper and lower recliner structure to be adjusted,
   a toothed quadrant coupled to said upper recliner structure,
   an electric motor having an elongated casing with first and second axial ends, with a drive shaft extending from said first end, said lower recliner structure supporting said motor adjacent both said first and second ends,
   a worm gear affixed to said drive shaft and fixed thereto for rotation, and
   gear train means for providing a gear reduction and for communicating rotation of said drive shaft to said toothed rack, said gear train means including a plurality of gears consecutively intermeshed and each having a larger diameter toothed section for driving an adjacent gear through its smaller diameter toothed section, one of said gears meshed with said worm gear and another of said gears driving said toothed quadrant whereby rotation of said drive shaft causes the reclined angle between said upper and lower recliner structures to be varied.

2. A motor vehicle power seat recliner according to claim 1 whereby said drive shaft is rotationally compliant thereby absorbing shock loads acting on said motor and said gear train means.

3. A motor vehicle power sear recliner according to claim 1 further comprising a housing carrying a gear which meshes with said worm gear and a pair of worm gear supports and said housing being mounted to said lower recliner structure.

4. A motor vehicle power seat recliner comprising:
an upper recliner structure for supporting a seat back cushion,
a lower recliner structure for supporting a seat back cushion,
first pivot means for enabling the reclined angle between said upper and lower recliner structures to be selectively varied,
a toothed quadrant coupled to said upper recliner structure having its center at said first pivot means,
motion limiting means associated with one of said upper and lower recliner structures for limiting the maximum range of angular motion of said upper recliner structure relative to said lower recliner structure about said first pivot means,
an electric motor having an elongated casing with first and second axial ends and having a drive shaft extending from said first end, said lower recliner structure supporting said electric motor adjacent both said first and second axial ends,
a worm gear affixed to said drive shaft for rotation therewith,
gear train means for providing a gear reduction and for communicating rotation of said drive shaft to said toothed quadrant whereby rotation of said drive shaft causes the reclined angle between said upper and lower recliner structures to be selectively varied, said gear train means including at least three gear sets for meshingly interconnecting said drive shaft to said toothed quadrant, each of said at least three gear sets including a first toothed section having a larger diameter and a second toothed section having a smaller diameter such that said smaller diameter section meshes with said larger diameter section of an adjacent gear set, and
compliant means for absorbing torsional shock loads acting on said worm gear upon actuation of said electric motor.

5. A motor vehicle power seat recliner according to claim 4 wherein said motion limiting means comprises a pin member affixed to one of said upper and lower recliner structures and an accurate slot in the other thereof, said pin member confined for limited angular movement within said slot.

* * * * *